Figure 1:
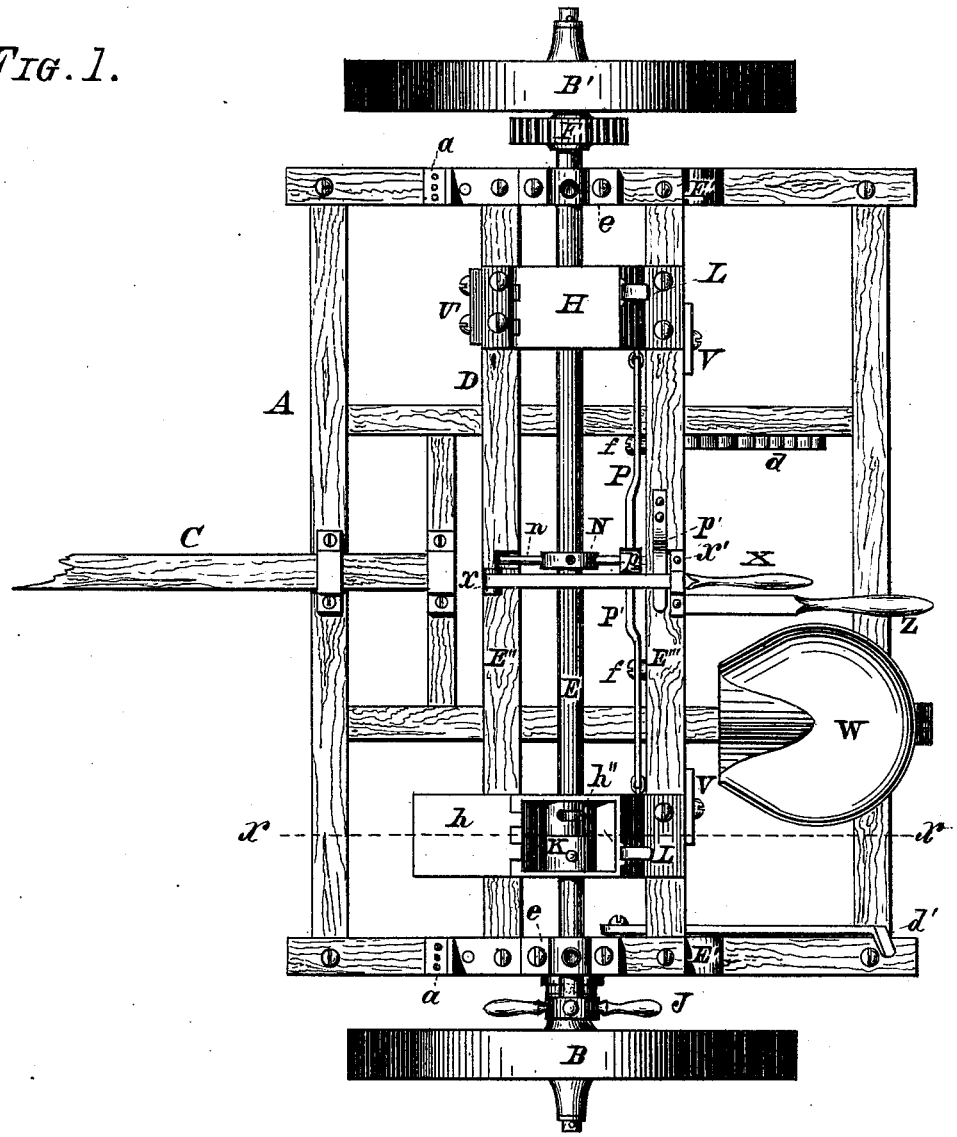

2 Sheets—Sheet 1.

J. F. CHAMPLIN.
Combined Check-Row and Drill Planter.

No. 196,072. Patented Oct. 16, 1877.

Witnesses:
Frank Hirsch
Chas. Brosart.

Inventor:
Justin F. Champlin,
by Michael J. Stark
his attorney.

N. PETERS, PHOTO-LITHOGRAPHER, WASHINGTON, D C.

2 Sheets—Sheet 2.
J. F. CHAMPLIN.
Combined Check-Row and Drill Planter.
No. 196,072. Patented Oct. 16, 1877.
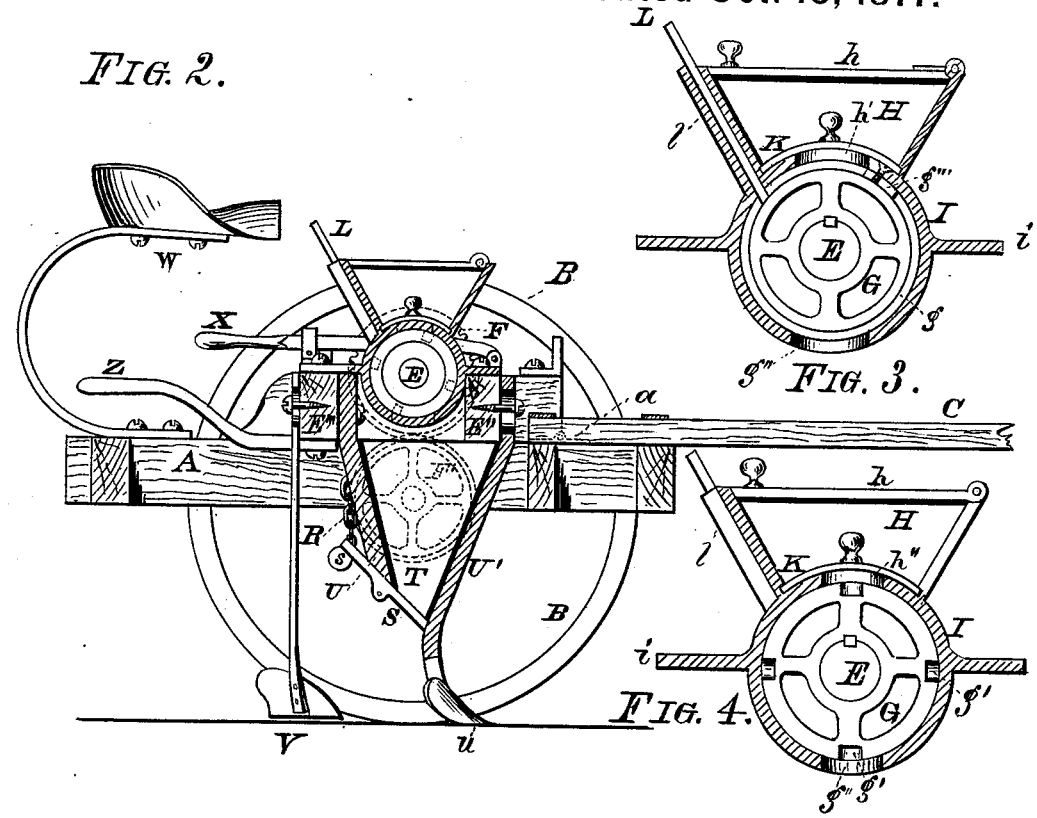
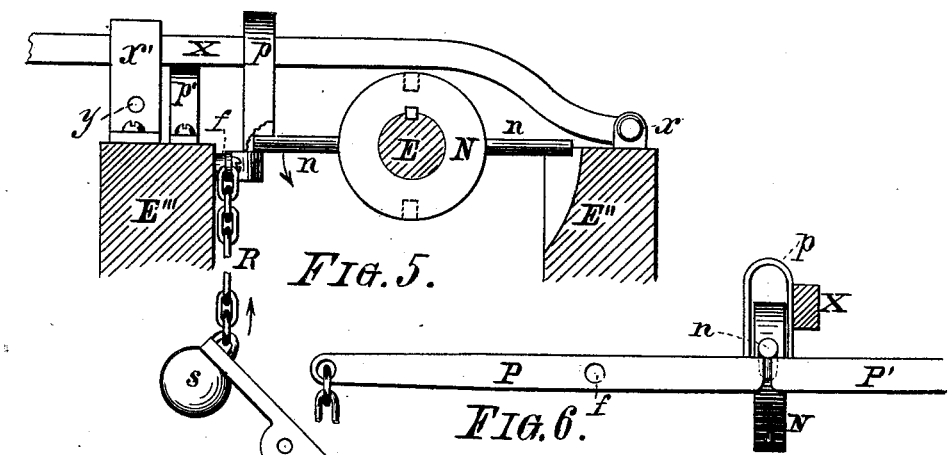
Witnesses:
Frank Hirsch
Chas. Brosart
Inventor:
Justin F. Champlin,
by Michael J. Stark
his Attorney.
N. PETERS, PHOTO-LITHOGRAPHER, WASHINGTON, D C.

UNITED STATES PATENT OFFICE.

JUSTIN F. CHAMPLIN, OF EAST AURORA, NEW YORK, ASSIGNOR OF ONE-HALF HIS RIGHT TO EMANUEL MEYERS, OF SAME PLACE.

IMPROVEMENT IN COMBINED CHECK-ROW AND DRILL PLANTER.

Specification forming part of Letters Patent No. 196,072, dated October 16, 1877; application filed April 26, 1877.

*To all whom it may concern:*

Be it known that I, JUSTIN F. CHAMPLIN, of East Aurora, in the county of Erie and State of New York, have invented certain new and useful Improvements on a Combined Check-Row and Drill Planter; and I do hereby declare that the following description of my said invention, taken in connection with the accompanying sheets of drawings, forms a full, clear, and exact specification, which will enable others skilled in the art to which it appertains to make and use the same.

This invention has special reference to a combined check-row and drill planter; and it consists in the arrangement of parts and details of construction, as hereinafter first fully described, and then pointed out in the claims.

In the drawings hereinbefore mentioned, which form a part of this specification, and serve to illustrate my invention more fully, Figure 1 is a plan. Fig. 2 is a transverse sectional elevation in line $x\ x$ of Fig. 1. Fig. 3 is a transverse sectional elevation through the hopper and cylinder, illustrating the drilling device. Fig. 4 is a similar view, illustrating the gaging of the seed for check-row planting. Fig. 5 is a partial section, showing the apparatus for actuating the seed-box valves automatically in elevation; and Fig. 6 is a front view of the same.

Like letters of reference indicate corresponding parts in all the figures.

A is a frame, of proper construction, dimensions, and strength, provided with wheels B B' and a pole or thill, C, for portability, and for forming a support for an auxiliary frame, D, hinged at $a$ to the frame A. This frame D, which is composed of two longitudinal beams, E'' E''', and two end beams, E', carries centrally a shaft, E, running in bearings $e$, placed upon the cross-beams E', and driven by means of the gear-wheel F, fixed to one extremity of said shaft E, and meshing into a similar gear-wheel, F', Fig. 2, attached to the wheel B'. To the shaft E are keyed or otherwise secured at suitable places two or more cylinders, G, revolving within cases I, fixed by the lugs or flanges $i$ to the main beams E'' E''' of the auxiliary frame D. These cylinder-cases I are provided each with a hopper, H, having suitable covers $h$, and within the hopper a slide, K, of half the width of that of said hoppers, so as to cover either one of the two openings $h'\ h''$ in said casing, which openings lead to the interior thereof. The casings are further provided with a narrow slide, L, operating in a suitable protuberant, $l$, of the hopper H. The cylinders G are provided each with a groove, $g$, corresponding to the aperture $h'$ and the slide L, and with a series of recesses, $g'$, meshing with the aperture $h''$. Upon the shaft E is placed a collet, N, having a number of radially-projecting arms, $n$, engaging with two levers, P P', pivoted at $f$ to the beam E'''. Each of the free extremities of these levers is connected, by means of a chain or similar contrivance, R, to a pivoted valve, S, attached to the lower contracted end of the seed-box T, secured to the bars U U', attached to the beams E'' E''', the forward bars U' serving at the same time as plows by being provided with mold-boards $u$, of the usual construction. The valves S are made top-heavy by the counterpoises, so as to keep the seed-box T closed.

In the rear of the seed-boxes T are placed two or more scrapers, V, placed in line with the plows $u$, and both plows and scrapers are rendered adjustable by means of slot-holes in their shanks, and screw-bolts passing through them into the beams E'' E'''.

X is a lever, pivoted to the beam E'' at $x$. It is provided with a stirrup, $p$, engaging with the levers P P', in such manner as to suspend the action of the seed-dropping device, in a manner hereinafter to be referred to.

Z is a hand-lever, fixed to the frame D near the seat W, so as to be within easy reach of the driver. It enables the manipulation of the auxiliary frame D in conjunction with a rack, $d$, by means of which said frame can be elevated and secured at any desired position, a brace-bar, $d'$, engaging with a properly-arranged stop on said frame, serving to lock it in a position at right angles to that in which it is ready for action.

J is a hand-wheel, fixed to the shaft E. Its object is to enable the discharge of the seed-box T at any time independently of the action of the automatic seed-dropping device by lifting the auxiliary frame to disengage the wheels F F'.

The operation of my combined check-row and drill planter is as follows: Supposing the planter to be used for planting seed in checked rows, in this case the slides K in the hoppers H are placed so as to uncover the apertures $h''$, which will establish a communication between said hoppers and the depressions $g'$. These hoppers, being supplied with the necessary seed, and made large enough to contain a sufficient quantity thereof, will deliver to said recesses $g'$ as much of the seed as the adjustment of the slides K allows to pass, which recesses, in their turn, deposit their contents into the seed-boxes T through the openings $g''$ in the cases I. With each revolution of the shaft E to accomplish the above, the collet N also makes one revolution, and its projections $n$, striking the levers P P', will depress the same as often as the said collet has projections. These levers, when being depressed, raise the weighted ends of the pivoted valves S, and thereby open the contracted end or mouth of the seed-boxes T, allowing their contents to escape and to drop into the furrows made by the plows $u$. In this manner the seed is automatically taken from the hoppers, accurately gaged or measured, delivered to the seed-boxes, and at the proper moment discharged therefrom, so that the scrapers V, passing over the ground directly behind the seed-boxes, cover the seed, and thereby complete the seeding process.

In starting new rows after turning on the ends of the field, and during turning, when it is desirable that the sowing process shall be suspended until the planter has arrived at the desired point, the auxiliary frame is raised by the handle Z sufficiently to disengage the cog-wheels F F', the frame being in the meantime supported by the toothed rack $d$. As soon as the machine arrives at the desired spot, and the seed-boxes in line with those places where the last seeds have been dropped in the previous rows, the hand-wheel J is taken hold of, and the shaft E revolved by it until the proper amount of seed has been dropped, stopping in just that position when the levers P P' have left the projecting arms $n$ of the collet N. Now, the frame D is lowered to re-engage the wheels F F, and the team started, when the automatic delivery of the seed will again take place, the same as hereinbefore described.

It will be readily seen that should any variation occur in the dropping of the seed, which would cause the lines to be out, it can be at once remedied by actuating the hand-wheel J to alter the time in accord with the circumstances.

Should it be desired to plant the rows closer together or farther apart, the necessary adjustment of the cylinders and accessories can be readily made by arranging the distance between the same accordingly, and by putting a collet, N, upon the main shaft, having the requisite number of projections.

This latter arrangement can be so far facilitated as to place a number of these collets with different projections at once upon said shaft, and bringing the correct one in proper position.

In order to use this machine as a drill, the slide K is adjusted to disclose the aperture $h'$, as shown in Fig. 3. This will open communication between the hopper and the seed-box through the circumferential groove $g$, unless the same should be interrupted by the slide L on one side of the hopper, it being permanently closed on the opposite side by the stop $g'''$, attached to the casing I. This slide L serves to adjust the amount of seed delivered when access to the slide K cannot be obtained on account of the hopper being filled, or to stop delivery altogether. If this slide be raised, the seed will pass from the hopper to the seed-box through the groove $g$, assisted by the revolution of the cylinder G, and drop from the seed-box into the furrow, the action of the valves S being suspended on account of the lever X having been depressed, and the stirrup $p$ having accomplished the same result with the levers P P'.

A stop-pin inserted into the aperture $y$ in the guard $x'$ serves to keep the lever X in its depressed position, while a spring, $p'$, raises it again as soon as said pin is withdrawn.

Having thus fully described my invention, I desire to secure to me by Letters Patent of the United States—

1. In a combined check-row and seed-drill planter, a distributing device consisting of a cylinder having peripheral depressions and a circumferential groove, revolving within a casing having two induction-openings, covered by a slide, by means of which either one of said openings may be uncovered to change the planter from a check-row to a drill planter, and vice versa, substantially as described, for the purpose indicated.

2. The combination, with the cylinder G, having the peripheral depressions $g'$ and circumferential groove $g$, of the casing I, provided with apertures $h'$ $h''$ $g''$, a hopper, H, and a slide, K, in the hopper, substantially as described and stated.

3. The combination, with the cylinder G, having a series of depressions, $g'$, and a continuous groove, $g$, arranged side by side in its circumference, of the casing I, carrying the seed-box H, said casing having the slide K arranged to cover either the depressions $g'$ or the groove $g$, and the slide L arranged to pass into the said groove $g$, the whole constructed and arranged to operate substantially as and for the use and purpose specified.

4. The combination, with the shaft E, of the sprocket-wheel N, oppositely-located levers P P', pivoted to the beam E''', chains R, valves S, and lever X, having the U-shaped bearer $p$, spring $p'$, and guide $x'$, as stated.

5. The combination, with the levers P P', of the lever X, having its fulcrum at $x$, and provided with the U-shaped bearer $p$, spring $p'$, and guide $x'$, with its stop-pin, as and for the purpose specified.

6. A combined check-row and drill planter, consisting of the mounted frame A, auxiliary hinged frame D, carrying the transverse shaft E, having two cylinders, G, provided with a series of depressions, $g'$, and a continuous groove, $g$, arranged to be separately uncovered by the slide K, hoppers T, provided with valves S, operated as specified, plows U, and scrapers V, the whole constructed and arranged to operate substantially in the manner as and for the purpose specified.

In testimony that I claim the foregoing as my invention I have hereto set my hand and affixed my seal in the presence of two subscribing witnesses.

J. F. CHAMPLIN. [L. S.]

Attest:
  MICHAEL J. STARK,
  FRANK HIRSCH.